Feb. 15, 1955     G. B. HIRSCH     2,701,987
POWER LOCKING-OUT DEVICE FOR MILLING MACHINES
Filed Feb. 8, 1954     6 Sheets-Sheet 1

Inventor:
George B. Hirsch,
by Maxwell Fish
Attorney

Feb. 15, 1955  G. B. HIRSCH  2,701,987
POWER LOCKING-OUT DEVICE FOR MILLING MACHINES
Filed Feb. 8, 1954  6 Sheets-Sheet 3

Inventor:
George B. Hirsch,
by Maxwell Fish
Attorney

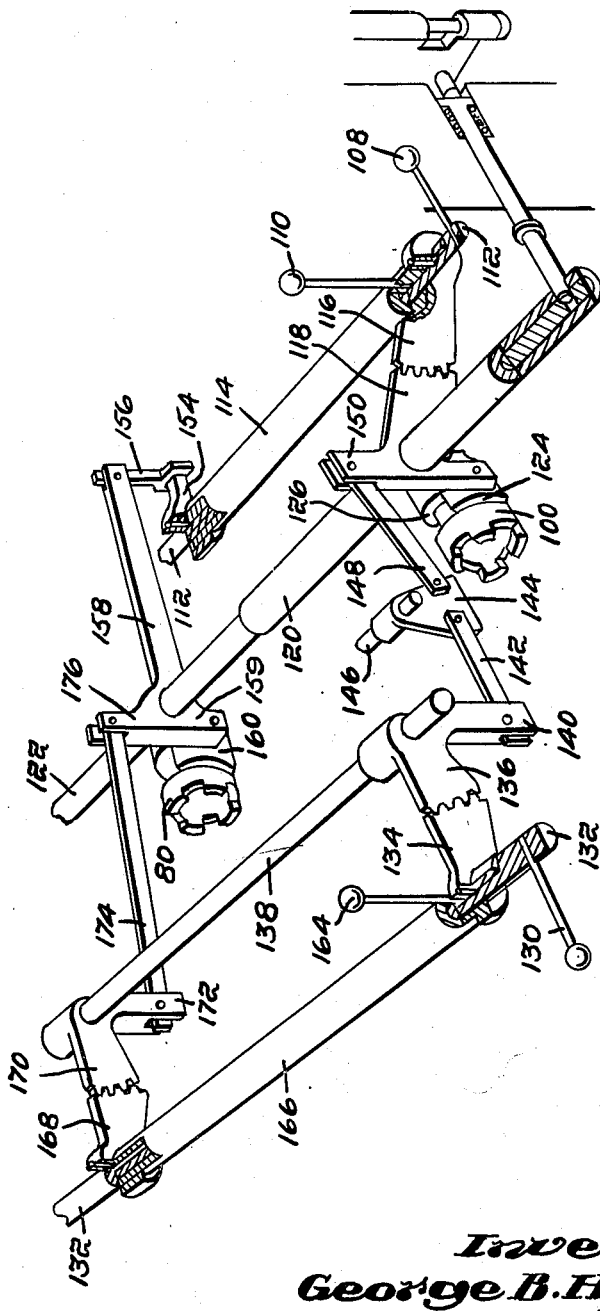

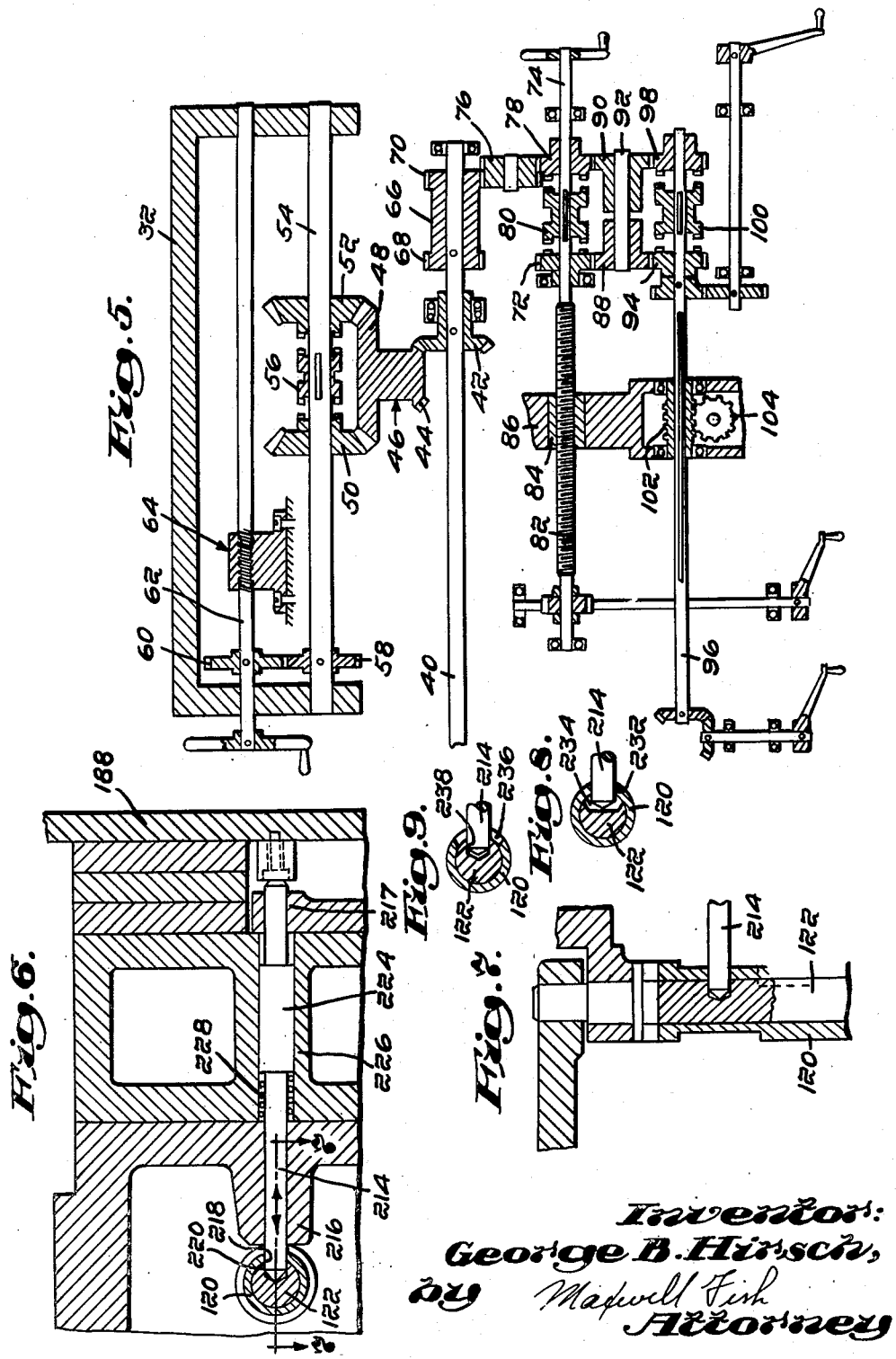

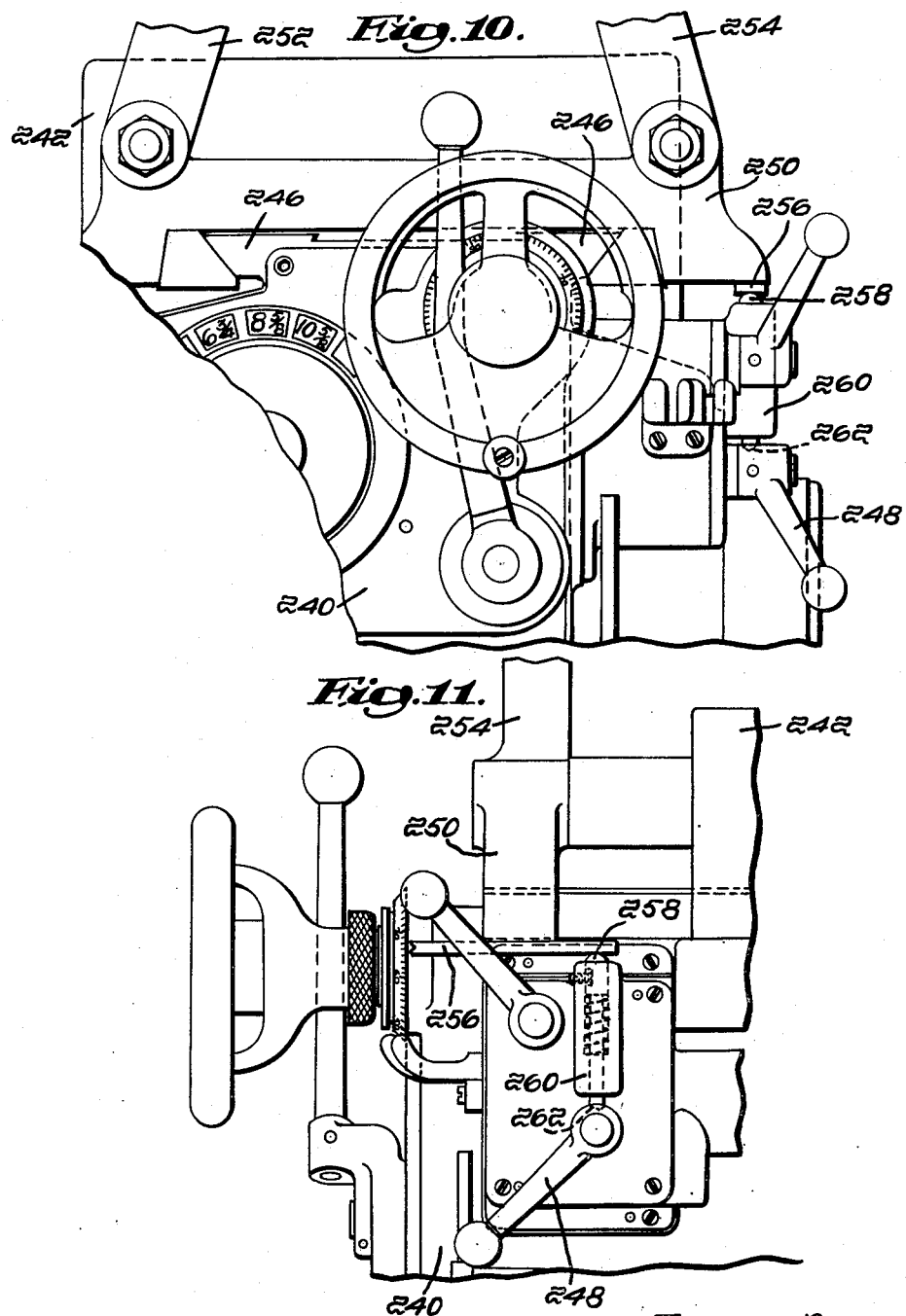

United States Patent Office 2,701,987
Patented Feb. 15, 1955

2,701,987

POWER LOCKING-OUT DEVICE FOR MILLING MACHINES

George B. Hirsch, Providence, R. I., assignor to Brown & Sharpe Mfg. Co., a corporation of Rhode Island Application February 8, 1954, Serial No. 408,815

11 Claims. (Cl. 90—21)

The present invention relates to improvements in milling machines, and more particularly to a power locking-out device for use in a milling machine having a tool spindle supporting column, a work support assembly including a plurality of relatively movable power operated supports and a tool arbor support carried from the column and from said support assembly which acts automatically when the tool arbor support is erected and in place to render inoperative the power drives for elements of the work support assembly on which the tool arbor support is carried.

The milling machine herein disclosed as embodying in a preferred form the several features of the invention consists generally of a machine base on which is mounted a column providing support for a milling cutter assembly including a forwardly projecting cutter spindle and a spindle arbor support. A work supporting assembly carried on the base includes a vertically adjustable knee, a clamp bed adapted for forward and back movements on the knee, and a longitudinally reciprocable work table which may be supported on a swivel support carried by the clamp bed. Operating devices are provided for the work supporting assembly including branch transmissions to each of the table, clamp bed and knee. The arbor support for the machine is of the general type including a pair of horizontally disposed arbor supporting bars, a vertically disposed bracket carried outwardly of said bars, and a gate which is carried on the clamp bed, and is securely fastened at its upper end to the arbor supporting bars and to the bracket. The arrangement is such that when the arbor support is set up a rigid connection is provided between the machine column and elements of the work assembly including the knee and clamp bed, which requires that the knee and clamp bed be maintained in a fixed relation on the machine.

It is a principal object of the invention to provide a lock-out means which is brought into operation automatically when the arbor support is set up to render inoperative the branch transmissions to those elements of the work supporting assembly on which the arbor support is secured.

More specifically, it is an object of the invention to provide means acting automatically when the arbor support is moved into position on the clamp bed to render inoperative the manual controls for engaging the branch transmissions for the clamp bed and knee and thereby prevent any inadvertent operation of the power drives for these elements of the work support assembly.

With these and other objects in view as may hereinafter appear, the several features of the invention consist also in the devices, combinations and arrangement of parts hereinafter described, together with the advantages to be obtained thereby, will be readily understood by one skilled in the art from the following description taken in connection with the accompanying drawings, in which:

Fig. 4 is a diagrammatic view in perspective showing the system of manual controls employed for operating the power clutches for the clamp bed and knee, and including the interlocking device employed for rendering these manual controls inoperative;

Fig. 5 is a diagrammatic view showing the driving connections for the work support assembly including the branch transmission to the saddle and knee;

Fig. 6 is a detailed selectional view taken on a line 6—6 of Fig. 3 to illustrate particularly the interlocking device rendered operative by the closing of the tool arbor support gate for rendering the manually operable clutch controls for the clamp bed and knee inoperative;

Fig. 7 is a detailed sectional view taken on a line 7—7 of Fig. 6.

Fig. 8 is a detail sectional view taken on the same plane as Fig. 6 of a modified form of the interlocking device;

Fig. 9 is a detail sectional view taken on the same plane as Fig. 6 illustrating a further modification of the interlocking device;

Fig. 10 is a fragmentary view in front elevation of a milling machine having the conventional arrangement of the work supporting assembly including table, saddle, knee and arbor support, and provided with an interlocking device interposed between the arbor support and knee vertical motion control lever; and Fig. 11 is a view in right side elevation of substantially the parts shown in Fig. 10.

Figure 1:
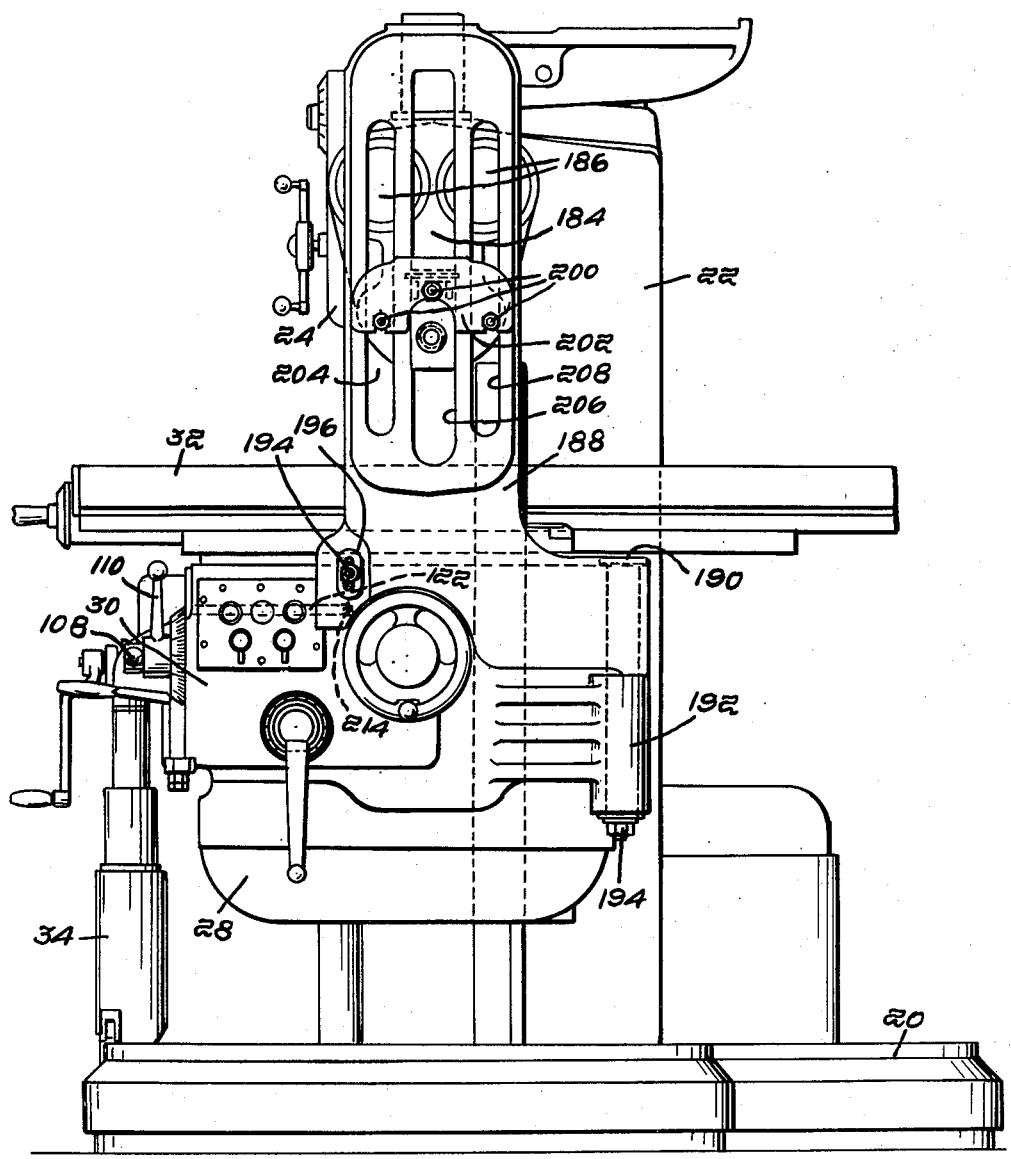
Fig. 1 is a view in front elevation of a milling machine embodying in a preferred form the several features of the invention.

Referring specifically to the drawings the milling machine illustrated as embodying in a preferred form the several features of the invention comprises a base 20 from which is mounted a vertically disposed column 22 which carries an offset milling cutter spindle head 24 which houses a milling cutter spindle 26. The machine is provided also with a work supporting assembly including a knee 28 vertically adjustable on ways, not specifically shown, formed on one side of the column 22, a clamp bed 30 supported on ways, not specifically shown, for forward and back movements on the knee 28, and a work supporting table 32 slidably supported for translatory movement transversely of the clamp bed.

A telescoping drain 34 connected between a drainage surface, generally indicated at 36 on the clamp bed, and at its lower end arranged to empty into a pan formed in the base 20 is utilized for the collection and return of coolant to the pan coolant receiving pan and to the coolant reservoir in the base. This mechanism, however, is not part of the present invention but forms the subject matter of an application Ser. No. 352,233, filed April 30, 1952 in the name of Benjamin P. Graves, and will not, therefore, be further referred to herein.

Figure 3:
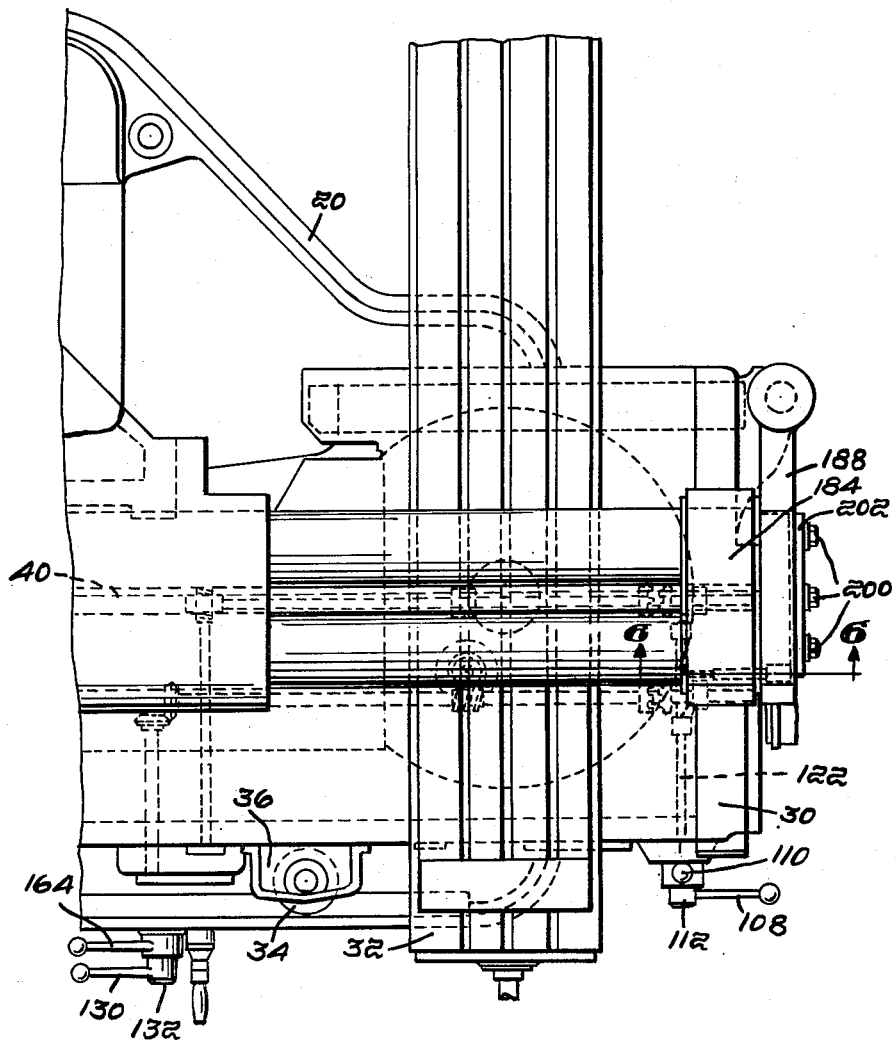
Fig. 3 is a plan view of substantially the parts shown in Figs. 1 and 2.

The driving mechanism for moving the several elements of the work support assembly comprises a horizontally disposed main drive shaft 40, see Figs. 3 and 5, which is supported in the clamp bed, and individual branch transmissions which are connected to be driven from said main drive shaft 40 for imparting movement to each of the knee, clamp bed and work table. The main drive 40 extends the entire length of the clamp bed. A branch transmission is provided for driving the work table comprises suitable bevel gear connections including bevel gear 42 on the shaft 40 and a meshing bevel gear 44 secured to a vertically disposed shaft 46 which carries also a bevel gear 48, connected at opposite sides thereof to bevel driving gears 50, 52 loosely supported on a jack shaft 54 extending along the length of the table support 32 transversely of the machine. A clutch element 56 keyed to and slidable on shaft 54 is arranged to be shifted into clutching engagement with either of gears 50, 52 to drive the shaft 54 in either direction. The shaft 54 is in turn connected by spur gears 58, 60 with a screw shaft 62 and a nut 64 through which translatory movements are imparted to the table 32.

The main drive shaft 40 is also connected through suitable gearing to impart forward and back movements to the clamp bed 30, and up and down movements to the knee 28. The branch transmission is provided for driving the clamp bed which comprises a drum 66 secured to the drive shaft 40 and provided with two reverse driving gears 68 and 70, the gear 68 being directly connected with a clutch gear 72 loosely mounted on a clamp bed actuating screw shaft 74. The gear 70 is connected to an idler gear 76 which meshes with a reverse driving clutch gear 78 also loosely sleeved on the clamp bed actuating screw shaft 74. A clutch element 80 keyed to and slidable on shaft 74 is adapted to be moved into clutch engagement with either of clutch gears 72 or 78 to drive the shaft 74 in opposite directions. A screw 82 on the shaft 74 meshes with a nut 84 which is rigidly fixed in a portion 86 of the knee 28.

A branch transmission is provided for imparting up and down movements to the knee 28 which comprises two idler gears 88 and 90 on a jack shaft 92, the gear 88 meshing with the clutch gear 72 and with a clutch gear 94 loosely supported to turn on a knee drive shaft 96, and the gear 90 meshing with clutch gear 78 and with a clutch gear 98 also loosely supported to turn on the knee drive shaft 96. A sleeve clutch member 100 splined to turn and slidable upon the driven shaft 96 is shiftable to operatively connect on the knee drive shaft 96 to be driven through the clutch gear 94 or through the clutch gear 98 alternatively in opposite directions. A worm 102 splined to the shaft 96 engages with a worm gear 104 which forms part of the screw and sleeve nut mechanism for raising and lowering the knee support.

A system of manual controls is provided for shifting the sleeve clutch member 80 for operating the clamp bed, and for shifting the sleeve clutch member 100 for operating the knee. These controls are constructed and arranged to provide two operating stations accessible to the operator at locations on the machine at the front and to the rear of the work supporting table 32. The system of manual controls employed is shown in diagrammatic form in Fig. 4 of the drawings. The manually operable power controls for the knee and clamp bed comprise a front knee up and down controller 108, and a front clamp bed forward and back power controller 110, of which the knee controller 108 is secured to a transversely disposed rock shaft 112, and the vertically disposed clamp bed forward and back controller 110 is secured to a sleeve member 114 carried on the rock shaft 112. A transversely extended gear segment 116 mounted on the shaft 112 meshes with a gear segment formed on a knee clutch shifting rocker 118 secured to a sleeve member 120 loosely mounted to turn on a rock shaft 122. A downward extension of the clutch shifting rocker 118 is connected to a clutch shifting shoe 124 which rides in a peripheral groove 126 in the knee actuating sleeve clutch member 100. Power transmission of the knee can be initiated also from the rear control station of the machine by means of a manual controller 130 mounted on a transversely extending control shaft 132. A rocker member 134 secured to the shaft 132 meshes with a rocker arm 136 loosely supported to turn on a jack shaft 138. A downward extension 140 of the rocker arm 136 is connected by a link 142 with a depending rocker arm 144 which is supported on a shaft 146 and which is in turn connected by a link 148 with an upward extension 150 of the clutch shifting rocker 118.

Power movement of the clamp bed in either a forward or back direction is initiated from the front of the machine by means of the vertical controller 110 pinned to the sleeve member 114. An arm 154 secured to the sleeve 114 is connected by a link 156 with a forwardly projecting arm 158 of a clamp bed clutch shifting rocker member 159 having a downwardly projecting portion thereof secured to a clutch shoe 160 which rides in a peripheral groove in clutch member 80. A manually operable power control for effecting forward and back movement of the clamp bed is provided at the rear control station of the machine in the form of a vertically disposed controller arm 164, secured to a sleeve 166 on shaft 132. A gear segment 168 secured to the sleeve 166 meshes with a gear segment 170 freely to turn on the pivot shaft 138. The gear segment 170 is formed with a downward extension 172 which is connected by a link 174 with an upwardly extending arm 176 of the clamp bed clutch shifting rocker member 159.

Figure 2:
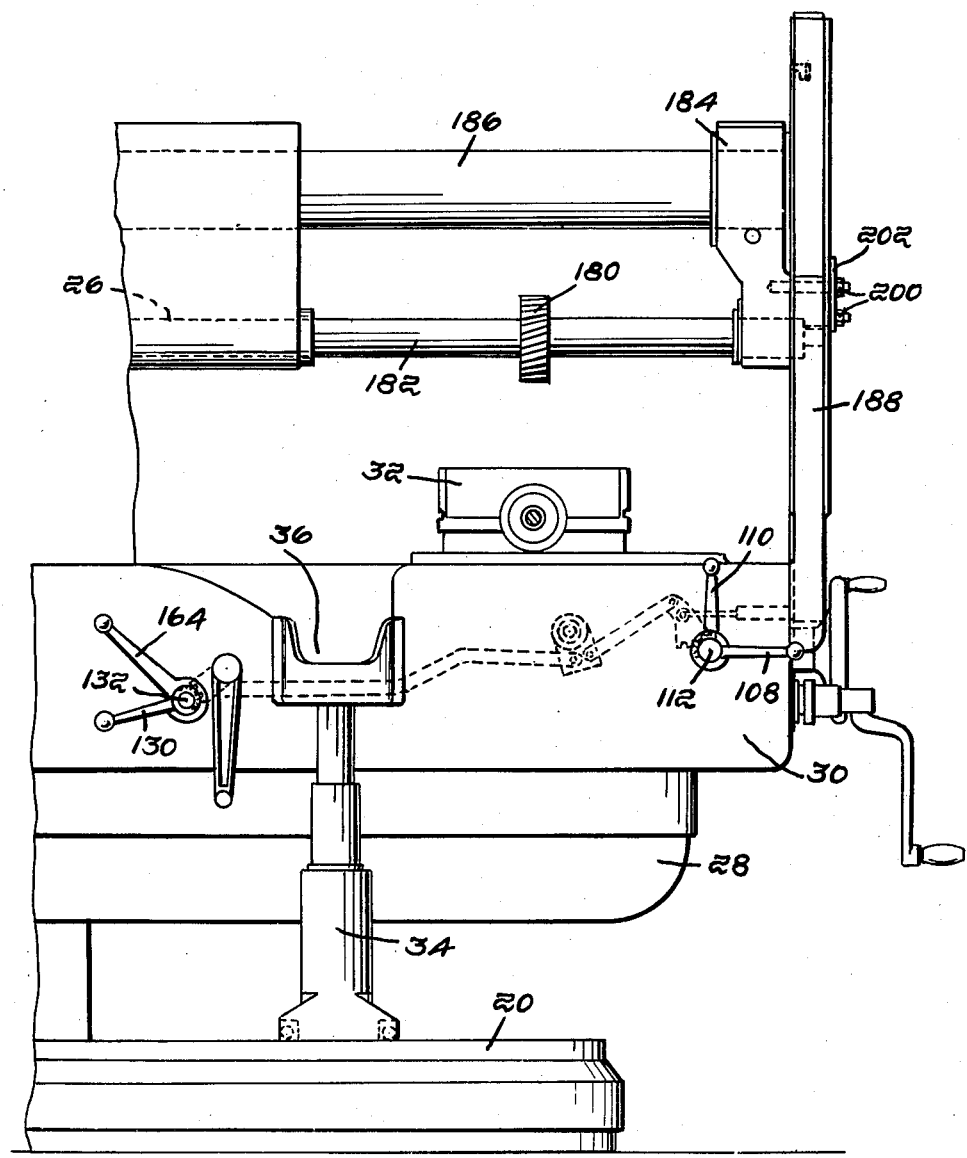
Fig. 2 is a somewhat fragmentary view in left side elevation of the milling machine shown in Fig. 1, including portions of the machine column, work supporting assembly and arbor support in place thereon.

In the illustrated machine a milling cutter 180, see Fig. 2, is mounted on a milling cutter arbor 182 connected at its inner end to the milling cutter spindle 26. With the arrangement shown the arbor 182 is further supported at its outer end in a bearing provided in an arbor yoke 184 which is also fitted over two parallel support arms 186 mounted from cutter head 24 of the machine above and in parallel relation to the cutter spindle 26 and arbor 182. Further rigidity is obtained for the milling cutter arbor support assembly by means of a gate 188 which is mounted on the forward end of the clamp bed 30 and is rigidly fastened adjacent its upper end to the arbor yoke 184 and support arms 186. As shown in Figs. 1, 2 and 3 the gate 188 is pivotally supported at one side upon a pivot pin 190 rigidly fastened to the gate and carried at its lower end in a fixed bearing support 192 on the clamp bed 30. A nut 194 threaded to the lower end of the pivot pin 190 serves as a tightening means to rigidly secure the hinge portion of the gate when in arbor support position. The gate is adapted to be swung in a clockwise direction, as viewed in the plan view Fig. 3, to the operating position illustrated in which the gate is secured by means of a locking bolt 194 anchored on the clamp bed 30 and passing through a slot 196 formed in the gate. The arbor yoke 184 is rigidly secured to the gate 188 by means of three bolts 200 which are secured at their outer ends to a clamping plate 202 overlying the outer face of the gate, and which pass through vertical slots 204, 206 and 208 respectively in the upper portion of the gate, being threaded at their inner ends into apertures formed in the arbor yoke 184. When the arbor support above described has been erected and is in position as shown in Figs. 1, 2 and 3, it will be evident that any movement of the clamp bed 30 or knee 28 would cause a corresponding strain upon and springing of the rigidly supported machine parts with resulting damage and breakage in the machine.

In accordance with the present invention an interlocking device is provided which acts automatically when the gate 188 is swung into place in the arbor support position to cause the operating clutch member 80 for the clamp bed driving mechanism and the clutch member 100 through which vertical movements are imparted to the knee to be positively locked in a neutral position. The arrangement of these parts is such that the gate cannot be moved into its support position and secured until both of the clutches have been placed in neutral position; and neither of these clutches can be moved away from neutral position after the gate has been fully closed or until the gate has again been moved away from the locking position for the purpose of dismantling or adjusting the arbor support mechanism. The interlocking device referred to comprises a spring pressed plunger 214 which is supported in bearings 216 and 217 formed in the machine frame (see Fig. 6) and at its rear end is arranged to ride into corresponding recesses 218, 220 formed respectively in the sleeve member 120 and in the rock shaft 122.

As best shown in Fig. 6 the plunger 214 is provided intermediate its length with an enlarged portion 224 which rides in a somewhat enlarged bore 226 in the clamp bed casing. A compression spring 228 supported at one end against the abutment provided by the enlarged portion 224, and at its other end against a portion of the casing tends normally to move the plunger 214 to the right out of engagement with the recesses formed in the sleeve 120 and in the rock shaft 122. Movement of the gate 188 toward its closed or locking position causes a face portion of the gate to engage against the extended right hand end portion of plunger 214 thus moving the plunger to the left against the compression spring 228 so that the left hand end of the plunger is brought into locking relation to the manual control devices for the clamp bed and knee supports. It will be evident that if the knee actuating sleeve clutch member 100 has been shifted in either direction away from its neutral position that the sleeve 120 will have been correspondingly rocked to that the aperture 218 will be out of alignment with the plunger 214, and will thus prevent the gate 188 from being moved into position to be secured in place. If the clamp bed actuating clutch sleeve member 80 is in other than its neutral position the rock shaft 122 will be similarly turned so that the aperture 220 is out of alignment with the plunger 214 preventing movement of the gate into its arbor support position. The operator is thus unable to set up the arbor support assembly until both of the clutches referred to have been returned to their neutral positions. Thereafter, when the gate is closed the plunger 214, having been fitted into the apertures 218, 220 as shown in Fig. 6, will positively prevent the shifting of either of these clutches. When the arbor support assembly is again dismantled and the gate is swung to its inoperative open position the plunger 214 is free to move to the right from the position shown in Fig. 6 under the influence of the spring 228, and thus to free the manual controls for the respective clamp bed and knee clutches.

It will be understood that the invention in its broader aspects is not limited to the specific embodiment shown, but is equally applicable to machines having a different arrangement of the elements of the work supporting assembly and in which the arbor support assembly may be mounted from a movable support other than the clamp bed as herein disclosed. Within the spirit and scope of the invention the interlocking device herein disclosed may be employed to render inoperative the power drive to any movable support which is held in locked relation to the support assembly for the machine tool arbor when the tool arbor support assembly is fully erected and secured in place in the machine.

Figs. 8 to 11 of the drawings illustrate certain modifications of the invention in which the placing of the arbor support in the arbor support position is effective to lock out of operation only a particular secondary support of the work support assembly which might otherwise be inadvertently actuated by the operator with resulting damage to the machine.

Fig. 8 of the drawings illustrates a modified form of the invention in which the pin 214 is arranged for the neutral position of the sleeve member 120 and vertical motion knee clutch 100 to be brought into engagement with a closely fitting aperture 232 formed in the sleeve member 120, and enters an enlarged aperture 234 in the rock shaft 122 which has the effect of locking the sleeve member 120 and vertical motion knee clutch 100 in the neutral position, while permitting complete freedom of movement to the rock shaft 122 and the clamp bed forward and back motion clutch 80. The interlocking control shown in Fig. 8 is particularly adapted for use in a milling machine of the general type illustrated in Figs. 11 and 12, but provided with the power controls illustrated in connection with the embodiment of Figs. 1 to 7, inclusive, and in which the arbor support is mounted on the knee.

Fig. 9 of the drawings illustrates a further modification of the invention in which the interlocking device operates to disable only the clamp bed actuating mechanism when the arbor support is moved into arbor support position while permitting the knee vertical motion driving clutch to be freely shifted to either operating position. In this form of the device the locking pin 214 is arranged, when the arbor support gate 188 is moved to the arbor support position, to be projected through an oversized aperture 236 in the sleeve member 120 and into a closely fitting aperture 238 in the rock shaft 122 so that the knee vertical motion clutch 100 controlled by sleeve member 120 remains freely shiftable, whereas the clamp bed forward and back motion clutch 80 controlled by rock shaft 122 is thus securely locked in its central position. The interlocking control shown in Fig. 9 is particularly adapted for use in a milling machine of the general type illustrated in Figs. 1 to 7, inclusive, having the arbor support mounted from the clamp bed, where the machine is set up for the performance of milling operations requiring occasional vertical knee adjustments of the support assembly but in which the clamp bed is fixedly mounted against forward and back movement on the knee. For the vertical knee adjustments referred to the operator is required to loosen the nuts 200 to permit movement of the arbor support 188 with relation to the support arms 186 and milling cutter arbor 182. The interlock in this case will prevent inadvertent movement of the power controls for the clamp support.

Figs. 10 and 11 of the drawings illustrate a still further embodiment of the invention in a conventional milling machine of the type in which the arbor support is mounted from the knee. A conventional work support assembly is shown having knee, saddle, and stable elements. The vertically adjustable knee is designated at 240, and the forward and back movable saddle at 242. The transversely movable work supporting table carried by the saddle 242 is not specifically shown. It will be noted that the saddle 242 is supported for sliding movement on ways 246 on the knee 240.

Inasmuch as driving and control mechanisms for machines of the type referred to are well known and inasmuch as a driving and control mechanism suitable for driving the table, saddle and knee is herein fully illustrated and described it is believed sufficient with respect to the embodiment of Figs. 10 and 11 to point to a manual control lever 248 mounted on the right hand side of the knee which is shiftable in either direction from the normally inoperative position illustrated to effect power vertical movement of the knee in a corresponding direction.

As shown additional support for the milling cutter arbor is provided by means of an arbor support 250 mounted from the saddle ways 242 on the knee. The arbor support 250 comprises a base member which extends across the width of the saddle ways 246 and is rigidly secured thereto and to upwardly extending arms 252 and 254, which at their upper ends are secured to an arbor support bracket of well known construction, not here specifically shown.

In accordance with the invention the arbor support 250, above referred to, is provided at its right hand side with a horizontally disposed plate 256 which extends rearwardly along the right side of the machine. The plate 256 is arranged to overlie the upper end of a locking pin 258 longitudinally movable in a bracket 260 on the knee, and at its lower end to be projected into a closely fitting aperture 262 in the hub of the knee vertical motion control lever 248 when said lever is in the neutral position illustrated. The arrangement of these parts is such that the arbor support cannot be located and secured in the arbor support position until the locking pin 258 has been permitted to drop to its low position in aperture 266 by movement of the manual control lever 248 to neutral position. Once the arbor support 250 is in position, the engagement of the pin 258 with the aperture 262 will then positively prevent any shifting movement of the knee vertical motion control lever 248 from the neutral position.

Features of the illustrated machine which relate more particularly to the organization of the work supporting assembly and of the driving and control devices therefor form the subject matter of a separate application for Letters Patent filed in the United States Patent Office on or about November 24, 1953, and are, therefore, not claimed herein.

Features of the illustrated machine, which relate more specifically to the collection and return of coolant to the coolant reservoir provided in the base of the machine, form the subject matter of a separate application for Letters Patent in the United States Patent Office to Graves, Serial No. 352,233, filed on April 30, 1953 for Coolant Return System.

The invention having been described what is claimed is:

1. In a milling machine the combination of a machine base, a tool supporting column mounted from the base, and a work support assembly including a secondary support movably mounted from the base, and a work support mounted from the secondary support for translatory movement relative to the column, power driving means for said secondary support including a clutch having driving and neutral positions, a tool arbor support assembly including a support member arranged to be assembled in arbor support position on said secondary support, and a lock-out device having alternative clutch lock-out and inoperative positions, and operatively connected with the clutch to permit movement of the lock-out device to the lockout position only for the neutral position of the clutch, and operatively connected with the support member for said alternative blocking position of said element with the clutch engaged to block movement of the support member to the arbor support position.

2. In a milling machine, the combination with a machine base, a tool supporting column mounted from the base, and a work support assembly including a plurality of movable supports mounted one upon the other from said base for movement in diverse directions, a tool arbor support assembly including a support member arranged to be assembled in arbor support position on one of said movable supports, driving means for said diversely movable supports including individual clutches for each of said supports having neutral and driving positions, and a lock-out device comprising a lock-out element shiftable between clutch lock-out and support member blocking positions, said lock-out element being operatively connected with each clutch associated with any said movable support on which said arbor support is carried to be shifted to the lock-out position only for the neutral position of said clutch, and operatively connected with the support member for said alternative blocking position of said lock-out element with said clutch engaged to block movement of the support member to the arbor support position.

3. In a milling machine, the combination with a machine base, a tool supporting column mounted from the base, and a work support assembly including a secondary support movably mounted from the base, and a work support mounted from the secondary support for translatory movement relative to the column, power driving means for said secondary support including a clutch having driving and neutral positions, a tool arbor support assembly including a support member arranged to be assembled in support position on the secondary support, and a lock-out device comprising a lock-out element shiftable between clutch lock-out and support member blocking position, said lock-out element being operatively connected with said clutch to permit movement of the lock-out element to the lockout position only for the neutral position of the clutch, and operatively connected with the support member for said alternative blocking position of said element with said clutch engaged to block movement of the support member to the arbor support position.

4. In a milling machine, the combination with a machine base, a tool supporting column mounted from the base, and a work support assembly including a secondary support movably mounted from the base, and a work support mounted from the secondary support for translatory movement relative to the column, a milling cutter arbor support assembly including a support member movably supported on the secondary support to be shifted into arbor support position, driving means for said secondary support including a power clutch having alternative neutral and driving positions, a manual control device including a shiftable control member having a lock-out aperture formed therein and movable to shift the clutch between neutral and driving positions, and a lock-out device comprising a lock-out pin disposed between the control member and the support member arranged to be shifted by movement of the support member to arbor support position into locking engagement with said aperture in alignment with the pin for the neutral position of said control member and further arranged to be arrested by said control member and thereby to block movement of the support member to the arbor support position when said control member is in other than neutral position.

5. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a support member movably supported on the clamp bed to be shifted into arbor support position on the clamp bed, driving means for said supports including individual power clutches for the clamp bed and knee, separate manually operable devices for shifting each of said clutches between neutral and driving position, and a lock-out device comprising a lock-out element shiftable between clutch lock-out and support member blocking position, said lock-out element being operatively connected with said manually operable clutch shifting devices to permit shifting of said lock-out element to the lock-out position only for the neutral position of both of said clutches, and operatively connected with the support member to permit shifting of the support member to the arbor support position only for the lock-out position of the lock-out element.

6. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a gate pivotally supported on the clamp bed to swing into arbor supporting position on the clamp bed, driving means for said supports including individual power clutches for the clamp bed and knee, separate manually operable devices including two control elements sleeved one on the other with locking apertures formed therein and connected to shift the respective clutches between neutral and driving positions, and a lock-out device comprising a lock-out pin arranged to be inserted in said locking apertures formed in said control members only for the neutral positions thereof, and further adapted for the retracted position of said pin to block movement of the gate to the arbor support position.

7. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a support member movably supported on the clamp bed to be shifted into arbor support position on the clamp bed, driving means for said supports including individual power clutches for the clamp bed and knee carried on the clamp bed, and individual manual controls including separate control elements sleeved one on the other on the clamp bed with locking apertures formed therein and connected respectively to shift said clutches between neutral and driving positions, and a lock-out device comprising a lock-out pin disposed between said control elements and the gate arranged to be shifted by movement of the gate to arbor support position into locking engagement with said apertures only for the neutral positions of said control elements, and further arranged to block movement of the gate to the arbor support position when either of said control elements is in other than neutral position.

8. In a milling machine, the combination with a machine base, a tool supporting column mounted from the base, a work support assembly including a knee vertically adjustable from the base, a saddle supported from the knee for forward and back movement thereon, and a work table mounted from the saddle for translatory movement thereon, and a milling cutter arbor support assembly including an arbor support adapted to be assembled in arbor support position on the knee, driving means for said work support assembly including an individual power clutch for the knee, and a manual control for said clutch for effecting vertical movements of the knee, and a lock-out device shiftable between alternative clutch lock-out and inoperative positions, and operatively connected with the clutch to permit shifting of the lock-out device to the lock-out position only for the neutral position of the clutch, and operatively connected with the support member to permit assembly of the support member in support position on the knee only when the lock-out device has been shifted to the lock-out position.

9. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a support member arranged to be assembled in support position on the clamp bed, driving means for said supports including individual power clutches for the clamp bed and knee, separate manually operable clamp bed and knee clutch actuating devices to shift the respective clutches between neutral and drive positions, and a lock-out device shiftable between clutch lock-out and inoperative positions operatively connected with said clamp bed clutch actuating device to permit shifting of said lock-out device to the lock-out position only for the neutral position of said clamp bed clutch actuating device, and operatively connected with the arbor support member to permit assembly of the support member on the clamp bed only for the lock-out position of the lock-out device.

10. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a support member arranged to be assembled in support position on the knee, driving means for said supports including individual power clutches for the clamp bed and knee, separate manually operable clamp bed and knee clutch actuating devices to shift the respective clutches between neutral and drive positions, and a lock-out device shiftable between clutch lock-out and inoperative positions operatively connected with said knee clutch actuating device to permit shifting of said lock-out device to the lock-out position only for the neutral position of said knee clutch actuating device, and operatively connected with the arbor support member to permit assembly of the support member on the clamp bed only for the lock-out position of the lock-out device.

11. In a milling machine, the combination with a machine base, a tool supporting column mounted from the base, a work support assembly including a knee vertically adjustable from the base, a clamp bed supported from the knee for forward and back movement, and a work table mounted from the clamp bed for translatory movement, and a milling cutter arbor support assembly including a support member arranged to be assembled in support position on the clamp bed, driving means for said supports including individual power clutches for the clamp bed and knee, separate manually operable devices including two control elements sleeved one on the other connected to shift the respective clutches between neutral and driving positions and with apertures formed therein arranged to overlie one another for the neutral position of each of said control elements, the aperture in one of said control elements being a locking aperture of small size, the aperture in the other of said control elements being a non-locking aperture of large size, and a lock-out device comprising a lock-out element shiftable between a lock-out position engaged within said apertures in locking relation to the control element having the small aperture, and an inoperative position free of said apertures in which the arbor support is blocked away from the assembly position on the clamp bed.

No references cited.